May 31, 1927.
W. E. COOKE
CLOCK
Filed Dec. 20, 1924
1,630,891
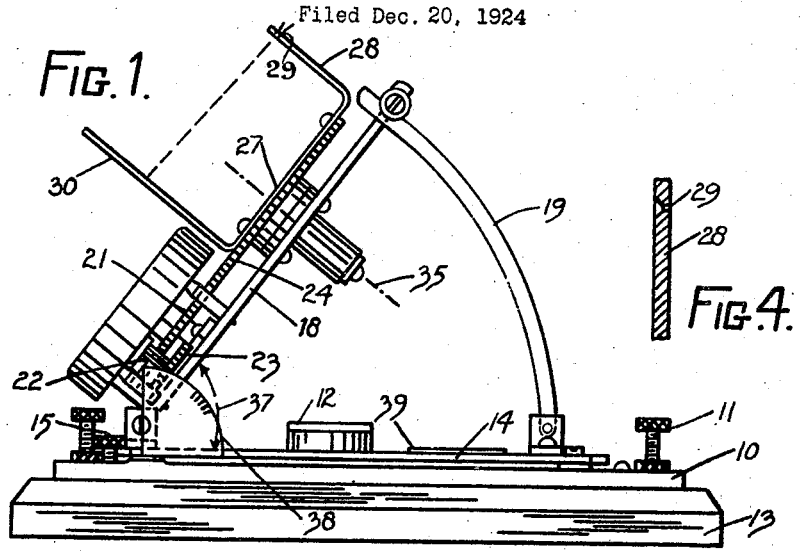
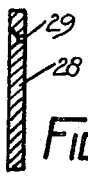
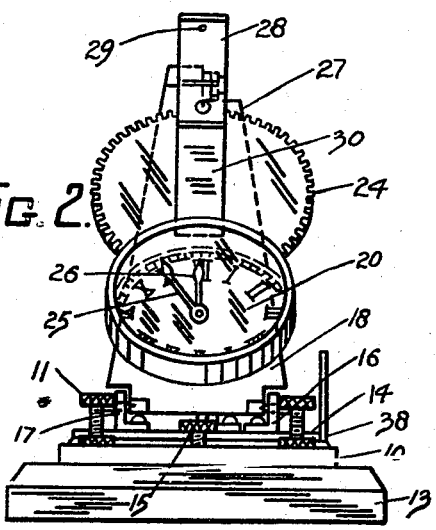
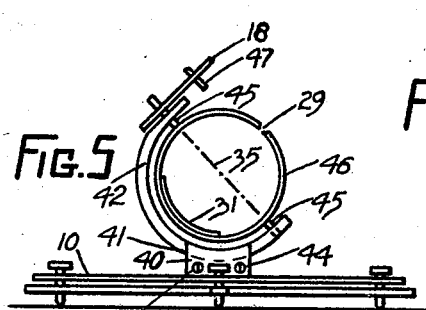
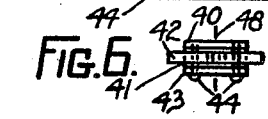
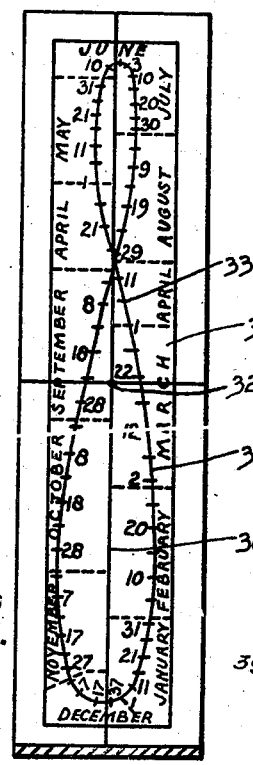
INVENTOR:
William Ernest Cooke
BY: Francis E. Boyce
ATTORNEY Patented May 31, 1927.

1,630,891

UNITED STATES PATENT OFFICE.

WILLIAM ERNEST COOKE, OF SYDNEY, NEW SOUTH WALES, AUSTRALIA.

CLOCK.

Application filed December 20, 1924, Serial No. 757,118, and in Autralia February 16, 1924.

This invention relates to an improved clock in which the hands are automatically moved to indicate apparent, mean, or standard time by the act of forming an image of the sun on a day chart.

The invention comprises apparatus for indicating on an ordinary clock dial the correct time during sunlight hours for every day of the year, for determining and indicating the geographical meridian through the clock's station, for determining the true geographical bearing of any location within view of the clock's station as distinguished from the compass or magnetic bearing, for determining the latitude of the clock's position, and for determining the time of sunrise and of sunset for any day of the year.

In the accompanying drawings:—

Figure 1 is a side elevation of one form of construction;

Figure 2 is a front elevation of the same;

Figure 3 is an enlarged plan of a day chart;

Figure 4 is an enlarged sectional elevation through portion of a sun pointer;

Figure 5 is a sectional elevation of another form of construction with the gearing and clock dial removed;

Figure 6 is a plan of the supporting means for the equatorial plate shown in Figure 5; and Fig. 7 is a plan view of a compass card or dial used in connection with the device.

A base plate 10, provided with levelling screws 11 and a spirit level 12, is mounted on a base board 13 which is adapted to be either permanently or detachably secured to a suitable pedestal not shown.

As shown in Figs. 1 and 2 the plate 10 carries an additional plate 14 which is pivoted on and is adapted to be swung laterally over the plate 10 and to be clamped thereto by means of a set screw 15.

Pivotally mounted on brackets 16, 17 carried by the plate 14 is an equatorial plate 18 which may be adjusted in vertical angular relation to the base plate and be clamped at the desired angle on a support such as the curved bar 19 carried by the plate 14. As the plate 14 may be moved laterally the equatorial plate 18 is capable of rotation in a horizontal as well as in a vertical plane.

The equatorial plate 18 carries a clock dial 20 and a gear train 21, 22, 23, and 24 controlling the clock hands 25, 26. To the principal gear wheel 24 is secured a sun pointer 27 in the form of an angle bracket frame. A member 28 of the pointer is pierced with a pin hole 29 (Fig. 4), and a parallel opposite portion 30 of the pointer is provided with a day chart 31 (Fig. 3) the central point 32 of which is perpendicularly opposite the pin hole 29.

The names of the months are set out on the edges of the chart, and the days of each month are indicated by their respective numerals and by short dashes 33 on the curved graph 34 which represents the angular daily displacement of the sun from its mean position—that is—the equation of time. For convenience of illustration and to avoid overcrowding of the chart five day intervals only are shown, and each ten day interval is indicated by its calendar numeral.

To set the equatorial plate 18 parallel to the celestial equator three operations are necessary (1) level the base plate 10, (2) elevate the plate 18 to make an angle with the plate 10 equal to the co-latitude. The same result may be obtained by elevating the axis of rotation 35 of the sun pointer to an altitude equal to the latitude. (3) The base plate must be rotated in a horizontal plane until the plate 18 is parallel to the celestial equator, and the axis of rotation points to the celestial pole. Only when in that position will the sun's image, formed on graph 34 by suitably rotating the sun pointer, always fall on the correct date mark. To obtain this position rotate both base plate and sun pointer, the former horizontally, the latter on its axis, until the sun's image falls on the correct date mark. When this occurs the axis of rotation must be pointing to the pole, the instrument must be correctly orientated, and the rotation of the sun pointer will have so moved the gear wheels that the clock hands will indicate true standard time.

To set the clock for indicating local mean time the base board 13 is placed on a pedestal in approximately the geographical meridian with the clock dial 20 facing the south in the Southern and the north in the Northern Hemisphere. The screw 15 is loosened and the base plate levelled. The sun pointer is rotated and the plate 14 swung laterally over the plate 10 until the image of the sun falls on the centre line 36 of the chart; the equatorial plate 18 is then adjusted in vertical angular relation to the plate 14 or to the plate 10 until the sun's image falls on the level of the correct date mark on the chart. Plate 18 is then clamped to the bar 19 and plate 14 adjusted laterally to bring the image on the correct date mark. Screw 15 is then tightened.

The complement of the angle 37 between the plate 18 and the plate 14 when the clock is correctly set gives the latitude of the clock's station, and this may be indicated by a graduated quadrant 38 mounted on the plate 14.

A compass card or a circle 39 graduated in degrees from 0° to 360° may be mounted or inscribed on the plate 14 so that when the clock is correctly set the geographical north and south line through the clock's position passes through the graduations 0° and 180°. The geographical bearing of any location visible from the clock's station may then be correctly determined.

The time of sunrise on any day of the year is determined by passing a straight rod through the pin hole 29 to touch the graph 34 at the chosen date mark and bring the rod to the horizontal with its free end pointing to the rising sun. By turning the horizontal rod and sun pointer to face the West the hands of the clock indicate the time of sunset on the date chosen.

The base plate 10 (Fig. 5) is circular and is provided with an upstanding lug 40 having a bay 41 in which a semicircular support 42 for the equatorial plate 18 is adjustably mounted by means of a sliding plate 43 and set screws 44.

The support 42 is provided with pivoting means 45 about which a circular band frame 46 forming the sun pointer is adapted to be rotated. A pin hole 29 is formed in the frame 46 and a day chart 31 is mounted on the frame with its central point diametrically opposite to the hole 29.

The equatorial plate 18 is rotatable in two planes by the rotation of the base plate 10 and of the support 42 in the bay 41 so that the axis 35 of the pivots 45 may be directed to the celestial poles. The principal gear wheel of the gear train controlling the hands is connected with the sun pointer and rotates about the axis 35.

Clock hands, not shown, may be mounted on the equatorial plate 18 on a spindle 47 which lies parallel to the axis 35.

The face of the semicircular support 42 is graduated for latitude and an indicator 48 (Fig. 6) facilitates correct positioning of the support 42.

I claim:

1. A sun clock comprising a base plate, means for levelling said plate, an additional plate pivoted on the base plate on a vertical axis, an equatorial plate mounted on and above the additional plate, a clock dial mounted on the equatorial plate, clock hands for the dial, a gear train carried by the equatorial plate and controlling the hands, and a sun pointer mounted on a member of the gear train.

2. A sun clock comprising a base plate, levelling screws on the plate, an equatorial plate mounted for angular vertical adjustment above the base plate, a clamp adapted to retain the equatorial plate in any of its adjusted positions, a clock dial carried by the equatorial plate, clock hands for the dial, a gear train controlling the hands, and a sun pointer mounted on a member of the gear train.

3. A sun clock comprising a base plate, an additional plate pivoted for angular horizontal adjustment with relation to the base plate, an equatorial plate mounted above the additional plate for angular adjustment vertically with relation to said plate, a clamp adapted to retain the equatorial plate in any of its adjusted positions, a second clamp adapted to retain the additional plate in any of its adjusted positions, a clock dial on the equatorial plate, clock hands for the dial, a gear train controlling the hands, and a sun pointer mounted on a member of the gear train.

4. A sun clock comprising a clock dial, clock hands for the dial, a gear train controlling the hands, a sun pointer mounted on a member of the gear train, a perforated member on the sun pointer, and a day chart mounted on the sun pointer for cooperation with said perforated member.

5. A sun clock comprising an equatorial plate mounted for angular adjustment, a clock dial carried by said plate, clock hands mounted centrally of the dial and adapted to traverse the same, a gear train for controlling the operation of said hands, a sun pointer mounted on a member of the gear train for rotation therewith, a perforated member carried by the sun pointer, and a day chart mounted on the sun pointer opposite said perforated member for cooperation therewith.

6. A sun clock comprising an equatorial plate mounted for vertical angular adjustment and adapted to be set parallel to the celestial equator, a bearing carried by said plate with its axis adapted to be directed toward the celestial poles, a sun pointer rotatable about said axis, a clock dial carried by the plate, clock hands mounted centrally of said dial and adapted to traverse the same, a gear wheel secured to the sun pointer, and a gear train connecting the gear wheel with the clock hands.

7. A sun clock comprising a base plate, levelling screws for the plate, an additional plate pivoted on the base plate, an equatorial plate hinged to the additional plate, a graduated quadrant on the additional plate for cooperation with said equatorial plate, a clock dial carried by the equatorial plate, clock hands for the dial, a gear train controlling the clock hands, and a rotatable sun pointer mounted on a member of the gear train.

8. A sun clock comprising a base plate, levelling screws for the plate, an equatorial plate mounted above the plate for angular adjustment vertically and horizontally with relation to said plate, a clock dial and clock hands for the dial carried by the equatorial plate, a gear train controlling the clock hands, a sun pointer mounted on a member of the gear train, and a graduated compass card mounted above the base plate.

9. A sun clock comprising a clock dial, clock hands for the dial, a gear train controlling the movements of the hands, a sun pointer mounted on a member of the gear train a day chart mounted on the sun pointer, there being a graph of the equation of time on the chart.

10. A sun clock comprising a clock dial, clock hands for the dial, a gear train controlling the movements of the hands, a sun pointer mounted on a member of the gear train, a perforated member on the sun pointer, and a day chart carried by the sun pointer for cooperation with said perforated member, said day chart bearing a record of the months of the year, a graph of the equation of time, graduations representing selected days of each month and a representation of the projection of a celestial meridian.

11. A sun clock comprising a base plate, levelling screws for the plate, an additional plate pivoted on the base plate for angular adjustment in a horizontal plane, a clamp for retaining the additional plate in any of its adjusted positions, an equatorial plate mounted on the additional plate for angular adjustment in a vertical plane, a clamp for retaining the equatorial plate in any of its adjusted positions, a bearing carried by the equatorial plate with its axis adapted to be directed to the celestial poles, a gear wheel mounted on said axis, a sun pointer mounted on the gear wheel, a clock dial and clock hands for the dial carried by the equatorial plate, and a gear train driven by said gear wheel and controlling the movements of the clock hands.

In testimony whereof I have signed my name to this specification.

WILLIAM ERNEST COOKE.